United States Patent Office 3,231,857
Patented Jan. 25, 1966

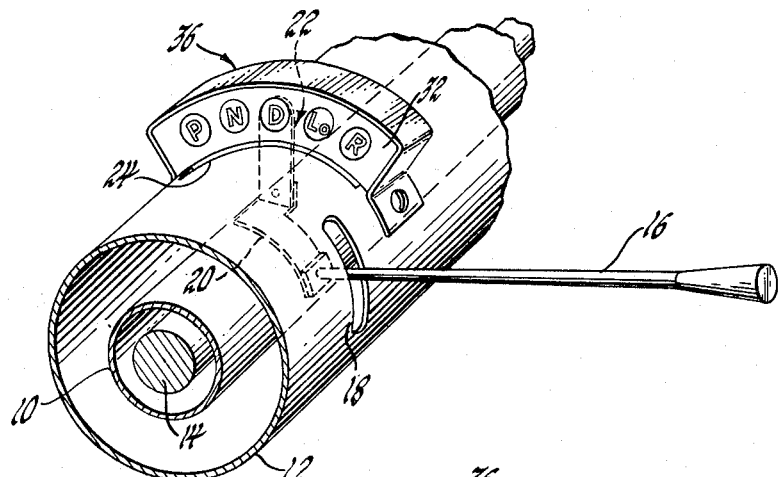
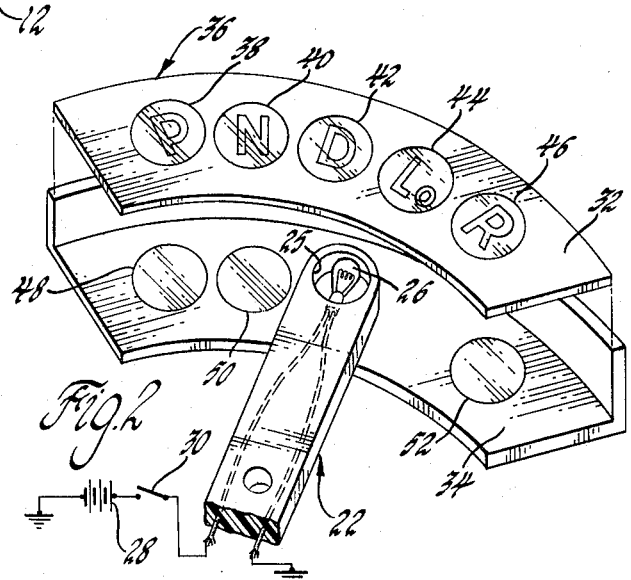
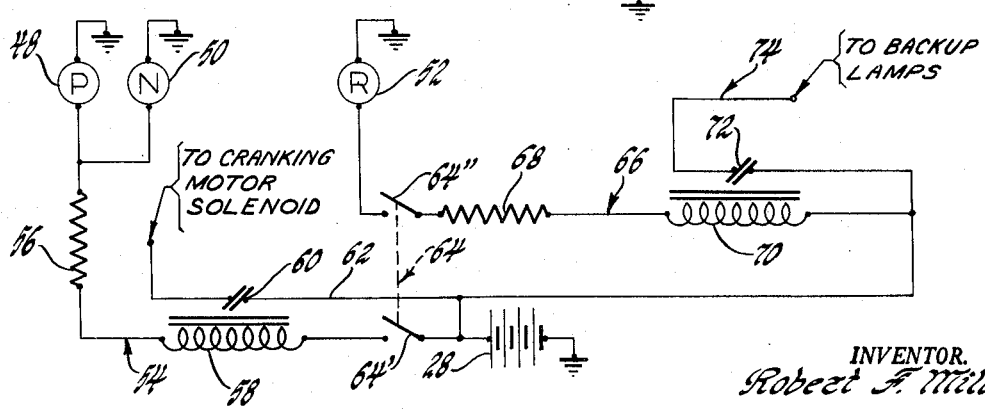

3,231,857
TRANSMISSION SELECTOR CONTROLS AND ILLUMINATING DEVICE
Robert F. Miller, Kokomo, Ind., assignor to General Motors Corporation, Detroit, Mich., a corporation of Delaware
Filed May 24, 1962, Ser. No. 197,312
12 Claims. (Cl. 340—54)

This invention relates generally to selector controls and particualrly to improvements in transmission shifter controls adapted, although not exclusively, for use with motor vehicles.

It is customary to utilize vehicle transmission shifter controls for controlling or operating devices other than the transmission. For example, in the Reverse setting of the shifter control, a backup lamp circuit is usually completed; and in the Neutral setting, a cranking motor circuit is either completed or may be completed after closing the usual ignition switch. These circuits are customarily completed by mechanically closing switches, either directly by the shifter control or indirectly through mechanical linkage. Such mechanically operated switches are not only difficult to service, but they are often erratic in operation due to the tendency to jam or become easily misaligned.

Accordingly, the invention contemplates a novel selector control utilizing a radiant energy source both to define legends designating the different settings of the control and to energize radiant energy sensitive control devices relating to certain of the settings. Another related and more specific aim of the invention is to provide a unique arrangement whereby a selector control has associated therewith a light source that serves both to illuminate legends corresponding to the control settings and to energize light sensitive cells that control functions relating to certain ones of the settings.

More specifically, the invention seeks to provide a new and different transmission shifter control in which a light source is maneuverable with a manually operated shifter lever to illuminate individual legends corresponding to the different transmission control settings and also to energize photocells, which are associated with certain of the transmission settings for controlling related circuits.

The foregoing and other objects and advantages of this invention will become apparent from the following description and the accompanying drawings in which:

FIGURE 1 is a perspective view of a transmission shifter control incorporating the principles of the invention;

FIGURE 2 is an enlarged exploded view of the dial housing shown in FIGURE 1; and FIGURE 3 is a diagram of circuits operated by the FIGURE 1 shift control.

Referring first to FIGURE 1, the transmission shifter control illustrated includes a transmission shifter tube 10 that is revolvably supported within a conventional vehicle steering column 12. A steering shaft 14 is rotatably mounted inside the transmission shifter tube 10 and serves to steer the vehicle in the usual way. The shifter tube 10 is revolved by a shifter lever 16 to different ones of a series of settings such as Park, Neutral, Drive, Low, and Reverse, and causes in any suitable way a transmission (not shown) to be conditioned for operation according to the selected setting. An elongated slot 18 in the side of the steering column 12 permits the shifter lever 16 to be connected to the shifter tube 10 in any suitable way, e.g., by a bracket 20, which in turn is affixed to the tube 10.

The bracket 20 also has attached thereto an indicator 22 that extends radially outwardly from the shifter tube 10 and through another elongated slot 24 in the steering column 12. The indicator 22 has a through opening 25 in the end thereof in which is positioned as a source of radiant energy a lamp 26. The lamp 26 may be supplied with current from any suitable source, such as a vehicle battery 28 whenever a switch 30 is closed.

As shown in FIGURES 1 and 2, the indicator 22 when revolved by the shifter lever 16 moves across the adjacent front and rear faces 32 and 34 of an indicator or dial housing denoted generally by the numeral 36. The housing 36 is attached to the steering column 12 in any appropriate way with the front face 32 arranged so that a series of indicator elements as Park, Neutral, Drive, Low, and Reverse indicator disks 38, 40, 42, 44, and 46 mounted therein are visible to the vehicle driver. These disks are formed of any suitable transparent material and each includes the depicted legend as P, N, D, Lo, and R, corresponding to the Park, Neutral, Drive, Low, and Reverse transmission settings. Whenever the transmission shifter lever 16 is positioned in one of these settings, e.g., the Drive setting portrayed in FIGURES 1 and 2, the Drive indicator disk 42 is illuminated. The legends are preferably formed of an opaque material; hence, the light defines the D so as to indicate to the vehicle driver that the transmission is in the Drive setting.

The rear face 34 of the indicator housing 36 has installed therein light responsive elements such as the Park, Neutral, and Reverse cells 48, 50, and 52, which are arranged directly opposite the Park, Neutral, and Reverse indicator disks 38, 40, and 46. The cells 48, 50, and 52 may be any suitable type of photoelectric cell, such as photo conductive cells, photo transistors, or photo voltaic cells, and will hereinafter be referred to as photocells.

Assuming that the cells 48, 50, and 52 are of the photo conductive type in which the resistance varies with illumination, the function of each can best be explained by now referring to FIGURE 3. In FIGURE 3, the Park and Neutral photocells 48 and 50 each have one terminal thereof grounded and another terminal connected to a cranking motor control circuit designated generally by the numeral 54. The control circuit 54 includes a resistor 56, a cranking motor relay 58, and a current source, which again may be the vehicle battery 28. Whenever the indicator 22 is positioned in the Park or Neutral setting, the illumination from the lamp 26 will decrease the electrical resistance of the corresponding Park photocell 48 or Neutral photocell 50. As the photocell resistance decreases, the current drawn from the battery 28 will increase until of a magnitude adequate to energize the cranking motor relay 58 and close normally open contacts 60 in a cranking motor circuit 62. With the contacts 60 closed, and assuming that a key operated ignition switch 64 is moved to the motor start position in which the lower portion 64' thereof closes, the cranking motor circuit 62 will be completed and the solenoid of the cranking motor energized. The cranking motor will then start the vehicle engine in the usual way. Of course, as soon as the indicator 22 is removed from either the Park or Neutral setting, the portion 64' of the ignition switch 64 opens. As a consequence, the cranking motor control circuit 54 is opened and there is no current drain on the battery 28.

The Reverse photocell 52 has one contact grounded and another contact electrically connected to a backup lamp control circuit 66. The backup lamp control circuit 66 in addition to the photocell 52 includes a resistor 68 and a backup lamp relay 70, both of which are connected to the vehicle battery 28. The backup lamp relay 70 controls a set of contacts 72 in a backup lamp circuit designated generally at 74. The ignition switch 64 is arranged so that only when in the motor operating position in which the upper portion 64" thereof closes, is it possible to complete the backup lamp control circuit 66. Therefore, when the ignition switch 64 is in the motor operating position and when the indicator 22 is positioned in the Reverse setting by the shifter lever 16, the light rays from the lamp 24, assuming the switch 30 is closed, will lower the electrical resistance of the Reverse photocell 52. As with the Park and Neutral photocells 48 and 50, an increased amount of current will be drawn from the battery 28 and energize the relay 70. Consequently, the contacts 72 will be closed and the backup lamp circuit 74 completed, thus lighting the backup lamps. When the shifter lever 16 is not in the Reverse setting, the resistance of the Reverse photocell 52 will be sufficiently high so as to cause only a small and negligible amount of current to be drawn from the battery 28. This small amount of current will not energize the backup lamp relay 70 nor will it represent an excessive drain on the battery 28.

In summary, whenever the shifter lever 16 is positioned in either the Park or Neutral settings, the corresponding Park or Neutral indicator disk 38 or 40 will be illuminated. Also, either the Park or Neutral photocell 48 or 50 will have the resistance thereof lowered sufficiently to cause the cranking motor control relay 58 to be energized. Hence, the cranking motor circuit 62 may be completed at any time the ignition switch 64 is in the motor start position. On the other hand, when the shifter lever 16 is moved to the Reverse setting, the Reverse indicator disk 46 is illuminated, and the electrical resistance of the Reverse photocell 52 is lowered sufficiently to energize the backup lamp control relay 70, assuming the ignition switch 64 is in the motor operating position. With the relay 70 energized the backup lamp circuit 74 is completed.

As can be now appreciated, by utilizing the photocells 48, 50, and 52, there is no need for the usual mechanically actuated switches and the linkage they customarily require for operating the cranking motor and backup lamp circuits. Therefore, there is no concern for misalignment, jamming, or other malfunctions that frequently occur with the mechanically operated switches. Additionally, if the cells 48, 50, and 52 have sufficient power capabilities, the relays 58 and 70 can be eliminated and the cranking motor and backup lamp circuits 66 and 74 operated directly.

What is claimed is:

1. In combination, indicator and dial elements movable relative to each other to a series of different settings, the dial element having legends thereon corresponding to certain of the settings, a radiant energy source maneuverable with one of the elements, and control means having a function related to one of the legends, the control means including a radiant energy responsive means positioned relative the source and the one legend so that in one of the settings of the source both the one legend is indicated and the radiant energy responsive means is energized to thereby cause the control means to be operated.

2. In combination, indicator and dial elements maneuverable relative to each other to a series of different settings, the dial element having legends thereon corresponding to certain of the settings, a light source maneuverable with one of the elements, and control means having a function related to one of the legends and including a photocell situated proximate the one legend and responsive to the light from the source, the source being so arranged as to cause in one of the settings both the corresponding legend to be illuminated and the photocell to be energized thereby causing the control means to be operated.

3. In combination, a movable member including an indicator and having a plurality of settings, a support adjacent the movable member and having a dial thereon, the dial having legends thereon corresponding to the movable member settings, a light source maneuverable with the movable member, and control means including a photocell situated proximate one of the legends and responsive to the light from the source, the movable member in one of the settings, thereof positioning the light source so as to both illuminate the legend corresponding to the one setting and energize the photocell thereby causing the control means to be operated.

4. In combination, a movable member including a light source movable therewith to a plurality of settings so as to perform as an indicator, a support adjacent the movable member and having a series of transparent elements each provided with an opaque legend corresponding to one of the settings and a photocell situated adjacent one of the transparent elements, the photocell being arranged to control a circuit related to the legend on the one transparent element when energized by the light source, the movable member in one of the settings being arranged so that the light source is positioned between the photocell and the one transparent element so as to illuminate the one transparent element and define the opaque legend thereon and also to energize the photocell.

5. In combination, transmission control means and dial means maneuverable relative to each other to a plurality of transmission settings, an indicator movable by the transmission control means, dial means positioned adjacent the indicator and having a series of legends thereon for visually indicating each of the transmission settings, a radiant energy source movable with one of the means for indicating the legend corresponding to a selected setting and auxiliary control means relating to one of the settings and including a radiant energy responsive cell positioned proximate the legend corresponding to one of the settings so as to be energized by the source in the one setting and thereby cause the auxiliary control means to be operated.

6. In combination, transmission control means maneuverable to a plurality of transmission settings, an indicator movable with the transmission control means, dial means positioned adjacent the indicator and having a series of legends thereon visually indicating each of the transmission settings, a light source movable with the transmission control means for illuminating the legend corresponding to the selected setting, and auxiliary control means relating to one of the settings and including a light responsive cell positioned proximate the legend corresponding to one of the settings so as to be energized by the light from the source in the one setting and thereby cause the auxiliary control means to be operated.

7. In combination, a transmission control maneuverable to a plurality of transmission settings, the transmission control including a light source maneuverable therewith so as to serve as an indicator, a dial positioned adjacent the light source and having a series of legends thereon arranged so as to be illuminated by the light source when the transmission control is in corresponding positions, and a photocell positioned adjacent one of the legends so as to be exposed to the light from the source in one of the settings, and an auxiliary control relating to the one setting arranged to be operated by the photocell when exposed to the light.

8. In a motor vehicle having a plurality of control devices and a transmission, the combination of transmission control and dial elements movable relative to each other to a series of different settings, the dial element having legends thereon corresponding to certain of the settings, a radiant energy source maneuverable with one of the elements, and means responsive to the radiant energy from the source, the radiant energy responsive means being positioned relative to the source and one of the legends so that in one of the settings of the source both the one legend is indicated and the radiant energy responsive means is energized for operating the control device relating to the one legend.

9. In a motor vehicle, the combination of transmission control and dial elements maneuverable relative to each other to a series of settings, the dial element having legends thereon corresponding to each of the settings, a light source maneuverable with one of the elements for illuminating the selected settings, and light responsive means for controlling a plurality of vehicle control devices related to certain ones of the settings, the light responsive means being also operated by the light source in the certain ones of the settings.

10. In a vehicle transmission shifter control, the combination of a transmission control member maneuverable to a series of transmission settings; the transmission control member including a radiant energy source performing as an indicator, a dial element positioned adjacent the transmission control member and having a series of transparent indicia corresponding to each of the transmission settings, the dial element also including a plurality of radiant energy responsive cells positioned opposite certain of the settings for operating related circuits, the energy source being arranged so as to illuminate the indicia in each setting of the transmission control member and also in each of the certain ones of the settings thereof to energize the corresponding cell.

11. In a vehicle transmission shifter control, the combination of a transmission control maneuverable to a series of transmission settings, the transmission control including a light source performing as an indicator, a dial element arranged opposite the light source so that the light source moves across the face thereof, the dial element including a plurality of transparent elements each provided with an opaque legend corresponding to one of the transmission settings, the dial element also including light sensitive means in certain ones of the settings, the light sensitive means being arranged to control a plurality of circuits relating to the certain settings including a vehicle cranking motor circuit and a backup lamp circuit, the light source being so arranged relative to the transparent elements and the light responsive means as to illuminate the legend in each setting of the transmission control and also to energize the light responsive means in each of the certain ones of the settings.

12. In a vehicle transmission shifter control, the combination of a transmission control rotatable to a series of transmission settings, the transmission control having a light source revolvable therewith to serve as an indicator, a dial housing including spaced apart faces between which the light source is maneuverable, one of the faces including a plurality of transparent elements provided with opaque legends corresponding to the different transmission settings, the other face having a series of photocells aligned with certain ones of the settings so that when the light source is adjacent to and illuminating certain ones of the settings, the photocells are energized, the photocells being arranged to control a plurality of circuits relating to the certain settings including a vehicle cranking motor circuit and a backup lamp circuit.

References Cited by the Examiner
UNITED STATES PATENTS

| | | | |
|---|---|---|---|
| 2,133,241 | 10/1938 | Baker | 250—220 |
| 2,521,479 | 9/1950 | Rautter | 250—216 |
| 2,672,116 | 3/1954 | Gunderson | 116—124 |
| 2,894,089 | 7/1959 | Newcomb | 200—61.54 |

NEIL C. READ, *Primary Examiner.*

LOUIS J. CAPOZI, *Examiner.*